US007979226B2

(12) United States Patent
Frosztega et al.

(10) Patent No.: US 7,979,226 B2
(45) Date of Patent: Jul. 12, 2011

(54) PRODUCTION OF COLOR COATINGS GRADIENTS, APPLICATION METHODS AND USES THEREFOR

(76) Inventors: Chris Bartek Frosztega, Montreal (CA); Frank McDonnell, Montreal (CA)

( * ) Notice: Subject to any disclaimer, the term of this patent is extended or adjusted under 35 U.S.C. 154(b) by 1534 days.

(21) Appl. No.: 11/325,053

(22) Filed: Jan. 5, 2006

(65) Prior Publication Data

US 2006/0190712 A1 Aug. 24, 2006

(51) Int. Cl.
*G01D 3/00* (2006.01)
*B41F 1/56* (2006.01)

(52) U.S. Cl. .......................................... 702/85; 101/484

(58) Field of Classification Search ........................ None
See application file for complete search history.

(56) References Cited

U.S. PATENT DOCUMENTS

| | | | | |
|---|---|---|---|---|
| 4,068,766 | A | 1/1978 | Schmitt | |
| 5,428,720 | A * | 6/1995 | Adams, Jr. | 345/604 |
| 5,429,682 | A * | 7/1995 | Harlow et al. | 118/681 |
| 6,016,151 | A | 1/2000 | Lin | |
| 6,623,846 | B2 | 9/2003 | Laird | |
| 6,649,214 | B2 | 11/2003 | Athey et al. | |
| 6,833,937 | B1 | 12/2004 | Cholewo | |
| 2002/0028297 | A1 * | 3/2002 | Dattilo | 427/407.1 |
| 2002/0053605 | A1 * | 5/2002 | Shimada | 239/79 |
| 2003/0097947 | A1 * | 5/2003 | Caruthers et al. | 101/484 |
| 2003/0156752 | A1 * | 8/2003 | Turpin et al. | 382/162 |
| 2003/0206820 | A1 | 11/2003 | Keicher et al. | |

OTHER PUBLICATIONS

Int. Search Report PCT/CA2007/000007, May 24, 2007, McDonnell, Frank et al.

* cited by examiner

*Primary Examiner* — Jonathan C Teixeira Moffat

(57) ABSTRACT

This invention pertains to a system and methods for the production of color coatings gradients on a surface using a blender and applicator, sensors and to computer memory containing stored color gradient representation information to be used for color composition customization and for visually displaying alphanumeric data/information on 2D and 3D surfaces. This invention integrates gradient specific programmable computer digital processes to function as internal editors, manipulate information and present an operator with multiple options and production overrides. This invention will make data analysis more interactive by utilizing existing external software applications as editors and expanding the process of visual communications for multiple purposes.

20 Claims, 12 Drawing Sheets
(5 of 12 Drawing Sheet(s) Filed in Color)

Fig. 7
Syntax Map
W R=255 G=255 B=0
O R=255 G=0 B=255
R R=0 G=0 B=255
D R=0 G=0 B=0
DYNAMIC
STATIC

PRODUCTION OF COLOR COATINGS GRADIENTS, APPLICATION METHODS AND USES THEREFOR

CLAIM OF PRIORITY

This application claims the benefit of:

Canadian Nonprovisional Patent Application No. 2,492,961 entitled COLOUR COATINGS BLENDER APPARATUS, PRODUCTION OF COLOUR COATINGS GRADIENTS AND APPLICATION METHODS AND USES THEREFOR by Chris Frosztega and Frank McDonnell, filed on Dec. 23, 2004.

CROSS-REFERENCE TO RELATED APPLICATION

This application claims the benefit of U.S. patent application, "COLOR COATINGS BLENDER APPARATUS" application Ser. No. 11/325,014, filed on Jan. 5, 2006. The Blender Apparatus is the device which blends a plurality of streams of color coatings in accordance with colorgradient representation information computed by and received from a computerized system as described in the specifications contained in this application.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

Production methods developed and practised by various industries have direct consequences on our aesthetics environment. Mass production economics, dictate coatings applicators be integrated with color changers which operate to dispense discrete colors for use in the mass production processes. Color changers allow for the production run interchangeability, further enhancing production line automation which results in solid colored, mass produced and mass consumed color homogeneity. It should be noted that the majority of prior art evaluated deals with color changers. As seen in prior art, color changers such as CA1226431, CA1203376 (U.S. Pat. No. 444,401), CA1245849 (U.S. Pat. No. 680,134) and CA1260355 (U.S. Pat. No. 680,351) and mixers for materials containing multiple components such as CA2110840 (U.S. Pat. No. 998,584), are constructed to fulfill their desired tasks.

Color changers as seen in prior art are utilized to change the colors of coatings, and in other prior art such as CA2038075 (U.S. Pat. No. 503,310), this change is integrated within self contained coatings applicators. Prior art as related to this field also points us to change means such as CA2342334 (JP 11/199551), CA2320323 (JP 10/360958), CA2248928 (PCT/US1997/004209) and U.S. 20040190367, combined with automatic painting robots in industrial processes.

Research into this field leads us to prior art within another industry group that contains variable blending mechanisms, such as 'Flavor-Injected Blending Apparatus, CA2265623 (U.S. Pat. No. 695,238), utilized in blending, where the varying blending methods create a range of acceptable flavour based compositions each with the same component concentration but varying characteristics.

Spray equipment is utilized to coat any object with the spray coating applicator located at a distance from the surface being coated which is determined by the width of the spray fan. The width of the spray fan can be as small as a paint droplet or as large as desired by the coating applicator operator, restricted primarily by spray coating applicator characteristics, coating technical and physical characteristics and environmental conditions.

Both printers and spray guns apply coatings and are thus coating applicators, but they have different operating characteristics. Printers and printing equipment apply coatings directly, or within relative proximity to surfaces, whereas spray equipment is not restricted by proximity and has the capability to project coating particles to coat surfaces of objects without disturbing texture specific aspects of the surface.

In prior art, both spellings of the word related to the subject matter, namely color and colour without the 'u', are used interchangeably.

Present numerical analysis software are capable of representing numerical analysis in color. Numerical analysis software such as Excel and Mathematica are designed to perform numerical data analysis and display the results as graphs, charts and images. The full range of possibilities as editors are still being explored.

DEFINITIONS

For the purpose of this application, terms for hardware, software and abstract models are as defined by Wikipedia, The Free Encyclopedia, English version, at http://en.wikipedia.org

BRIEF SUMMARY OF THE INVENTION

This invention pertains to the production of color coatings gradients to be used for color composition customization and for visually displaying alphanumeric data/information. It will make the process of data analysis more interactive and expand the process of visual communications for multiple purposes.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

Figure 1:
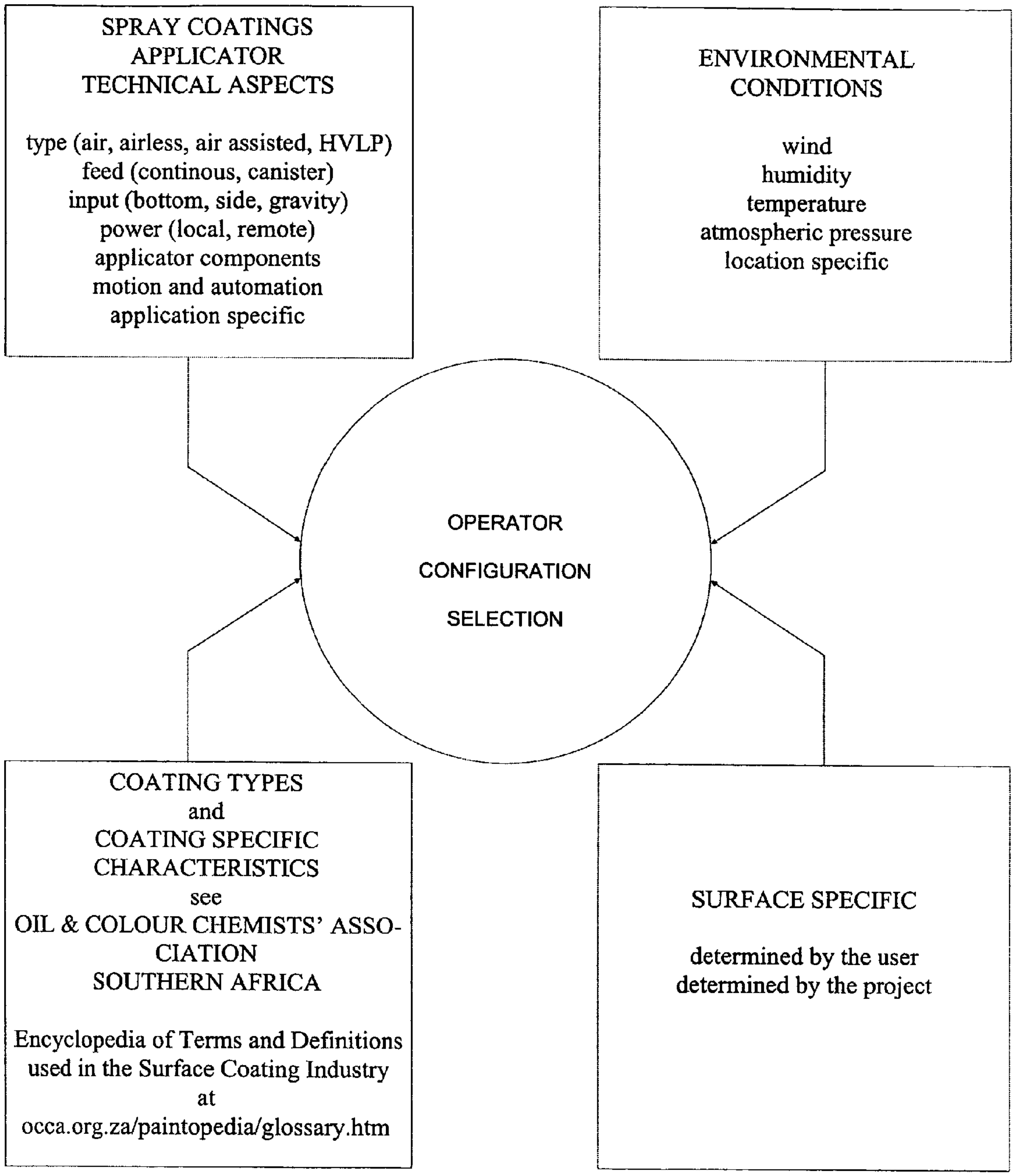
FIG. 1 Is a graphical representation of the major categories of parameters governing the configuration selection facing the operator. For example, the equipment to be used for spraying a 100 cm.times.160 cm canvas with latex while it hangs in a room heated to 20.degree. C. and having 30% humidity would be different from the equipment to be used for decorating a 500 cm.times.800 cm exterior wall with block filler in fluctuating weather conditions.
Figure 2:
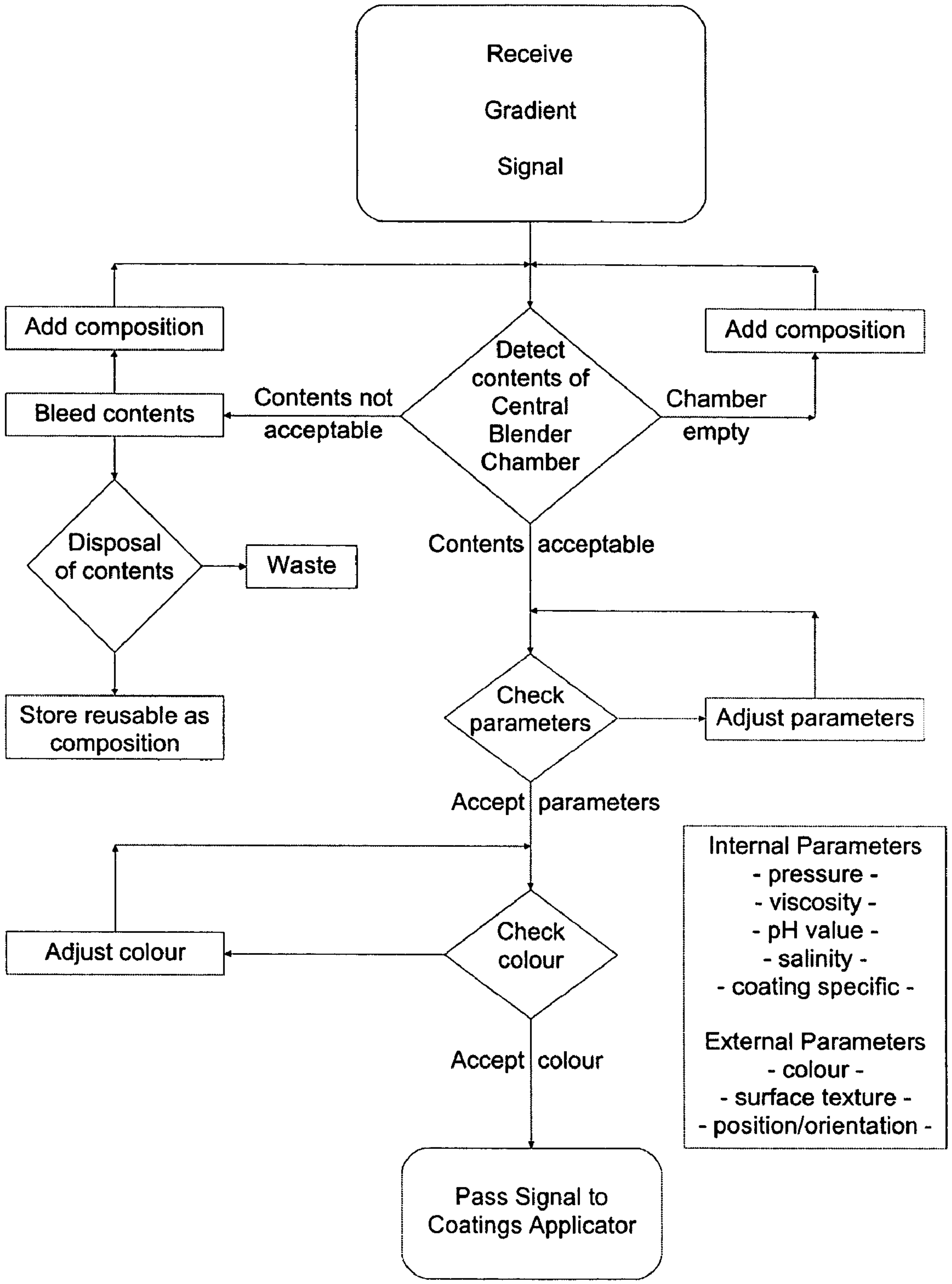
FIG. 2 Is a flow diagram illustrating the steps describing the method utilizing a programmable computer controlled digital processes for blending coatings within a central blender chamber of the blender apparatus where coatings are introduced through a plurality of primary input ports via selectable external valves which are in turn connected to containers of coatings compositions and where the contents of the said chamber are monitored by devices attached to a plurality of secondary ports.
Figure 3:
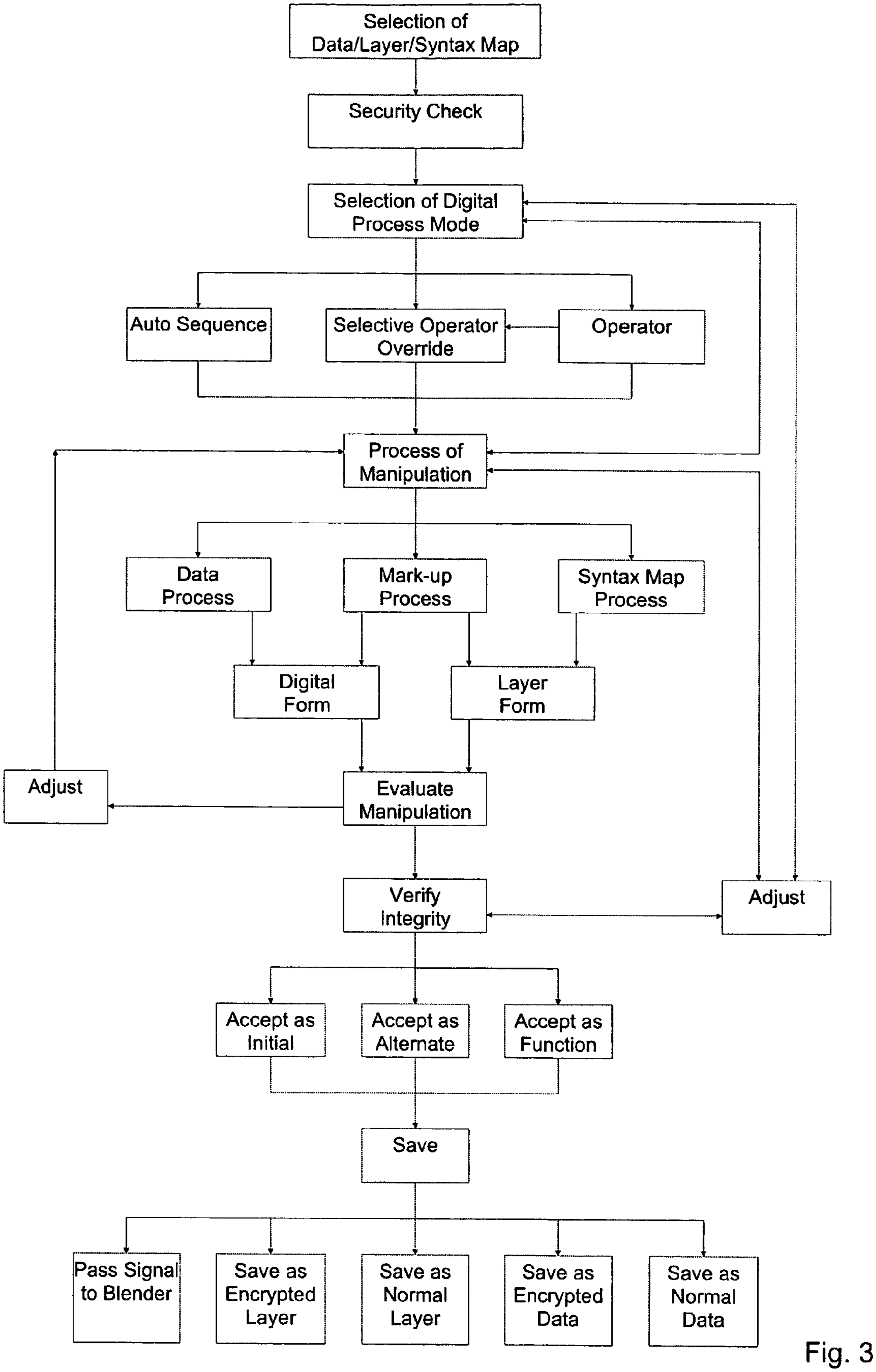
FIG. 3 Is a flow diagram illustrating the steps describing the process for converting color coated gradient related information where the said information is loaded into a programmable computer, for purposes of manipulation through information specific editors.
Figure 4:
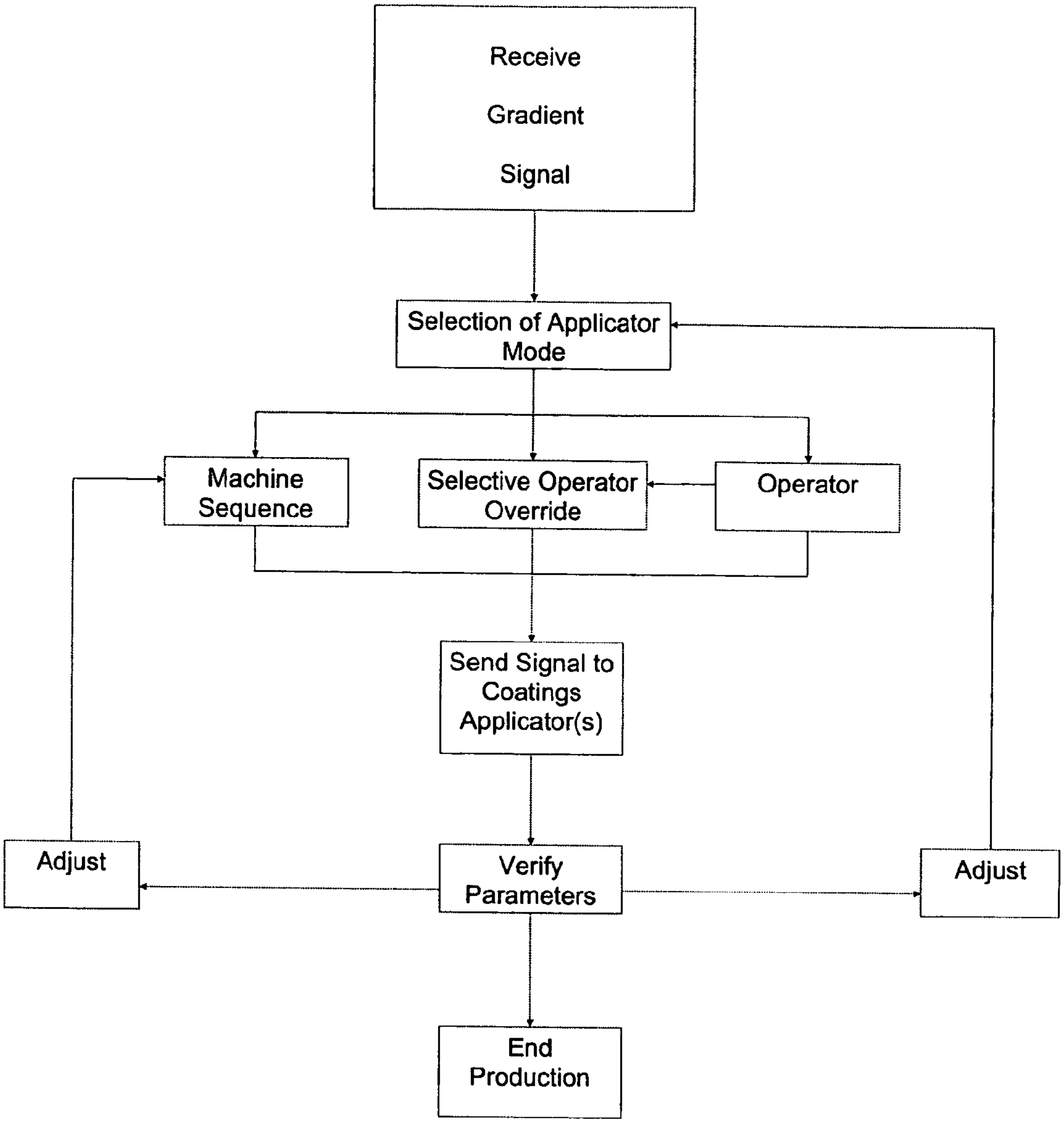
FIG. 4 Is a flow diagram illustrating the steps describing the process for producing color coated gradients where the control of the constituent parameters is effected by an operator, a programmable computer or a programmable computer with operator override.
Figure 5:
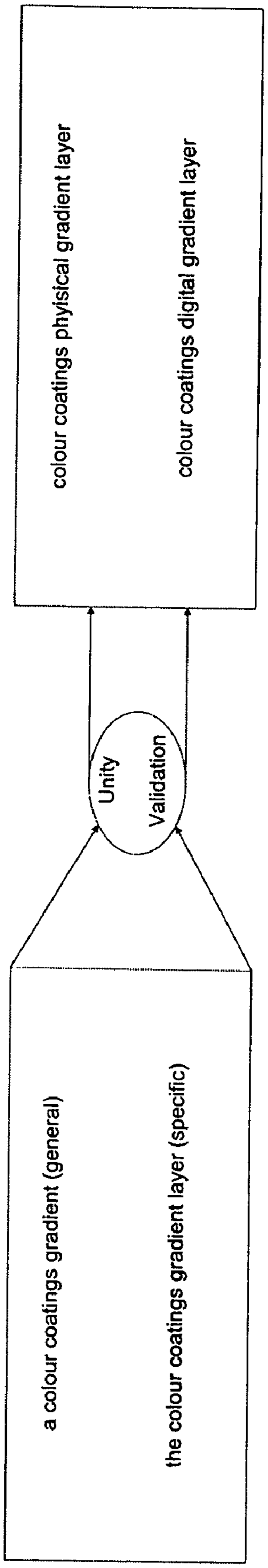
FIG. 5 Is a graphical representation of gradient unity and plurality.

This invention is comprised of the production of color coatings gradients, a range of products and related processes and methods and novel uses of said products.

The evolution of this invention commenced with the concept of a product which is intended to be of inestimable use. The said product being the visual display of alphanumeric information on any and all types of surfaces using color coatings. Existing methods employ color changers which deliver coatings having specific discrete colors. Air brush methods make use of discrete colors and shades are produced by overlaying coatings. Color printers and plotters deposit coatings on relatively small flat surfaces. Textiles and wallpapers are produced using silk-screen methods which deposit overlays of different color coatings. However, the product envisaged required a device which could produce and deliver, virtually instantaneously, colors of different hues and intensity to virtually any surface imaginable. This gave birth to the concept of devising an apparatus which would blend different color coatings as and when required.

The uses of the product which is to be considered a part of this invention are many and varied. It starts with data/information which is obtained from any source and which can be digitized to alphanumeric form, marked-up to convey meaning and manipulated. The information can be in any one of innumerable external layer forms such as, a 'Group of Seven' masterpiece, a Puccini aria, the electromagnetic spectrum, the periodic table of the elements or a company's financial records.

It was then realized that there could be occasions, particularly when dealing with a company's financial records, a process for defining the information needed to be devised and incorporated in this invention. New terms needed to be defined to cover the scope of uses for the product. This led to an extensive combination of apparatus, related processes, products and use of products. Hence, terms such as, gradient layer, data layer, digital layer, surface layer, physical layer, color gradient layer (cgl), color coatings gradient layer (ccgl), color coatings gradient layer syntax map (ccgl-sm), gradientism and gradientosophie (gradientosophy) have been coigned and are used to describe methods and processes.

The term layer, as used in this submission, is an information set which can be interacted with and the degree of manipulation is based on the complexity of its content. Hence, depending on the extent to which an operator wishes to manipulate the information, layers can be merged, overlaid or a combination of the two, for as many times as are considered necessary. An organization specific syntax map is used for ensuring the original information is secure. When satisfied with the level of security, the final layer is transmitted to the apparatus of this invention complete with an attached coating applicator, or some other commercially available means for visually displaying the 'coded' information.

A color coatings gradient layer which is being monitored can have its contents, as defined by a syntax map, identified with the aid of an editor. Markup instructions defining content can take the form of an element or an attribute. The pros and cons of the which method should be used has been the subject of an ongoing debate, according to markup-language experts. This demonstrated the need for facilitating an operator decision process by incorporating multiple external editors and their products for utilization with an internal gradient specific digital process editor so as to increase the scope of operator choices.

This invention is filed as one comprehensive statement due to the complexity of the process for producing color coatings gradient layers.

Digital and physical layers converge in a programmable computerized system where the signals are integrated and the resulting signals relayed to devices which control the coatings combinations for production of said gradients. The gradients produced are monitored by digital processes and resulting signals integrated in a programmable computer, to be combined with operator selected additional inputs and processes to produce a color coatings gradient layer which is stored as a digital and a physical gradient layer. To those unaware or unsure of gradient's complementary layer, a gradient (data, physical) may be generally referred to as a color coatings gradient. However when a gradient's markup status is known, it is specifically referred to as a color coatings gradient layer.

The production of color coatings gradient layers has many points of similarity to photography. As is the case with the latter, an image is captured (even visualized and manipulated in digital mode), it is then printed or developed. While photography can capture and display images generated by a large portion of the spectrum of electro-magnetic waves, gradient layers are the end product of the digital analysis of the said waves as well as the remainder of the spectrum and all else which can be captured can be the subject for digital analysis. The end results in both cases can be developed into physical images.

The versatility of the blender apparatus is embodied in its ability to be disconnectably connected to a wide range of coating applicators. Coating applicators such as spray guns, spray gun manifolds, plumbed-in automatic systems, texturing guns, air brushes, automatic brushes and automatic rollers have varying configurations and where applicable, contain different nozzle and needle/tip configurations. These spray applicators have to be specially configured by adjusting spray fan control and material flow control where applicable. These coating applicators may contain manual/automatic trigger assemblies or remote trigger controls. The interchangeability allows the apparatus to operate with spray coating equipment in both air, airless and air assisted modes and under various regulated pressures; where the coatings equipment may be conventional, HVLP or gravity fed. This aspect of interchangeability relies on the fact that all spray coating equipment have inlet ports to which the blender apparatus connects. Furthermore, the apparatus can be operated in any x-y-z orientation which makes for versatility and portability.

In addition to this interchangeability, the blender's configuration is such that it can be attached to or in devices such as coating injection moulds, coating assemblies, coating machines, coating robots, coating booths and rooms or coating platforms. Since spray coating applicators release coatings only upon receiving a specified input, the blender apparatus can be moved in any x-y-z direction prior to receiving another input signal. The design of the blender apparatus further allows for the inclusion of the said apparatus within self contained coating applicators. Through its modularity, the apparatus can be integrated with a coatings atomizer or attached directly to any device able to selectively or continuously disperse coatings as required by the application.

The plurality of possible configurations of the blender apparatus allows for the acceptance and blending of compositions comprised of fluids (e.g., liquids and gasses) and particulates (e.g., powders, crystals and granules), fluids of different viscosities and textures, fluids with additives, mediums and various combinations thereof; and to be adapted for use with both air, airless and air assisted spray coating application equipment. The desired end products of this invention and the methods used in the production thereof combined with operator experience and the utilization of programmable computer optimization specific digital processes, in unison determine the optimum configuration of all associated components.

This invention incorporates multiple benefits and advantages which are unique in themselves. In particular the invention allows for the uniform blending of coatings carried out in relative proximity to the coating dispersion means, thereby allowing for blending of color coatings immediately prior to application of the said coating which provides an operator of the said apparatus with the ability to create, virtually instantaneously, unique color gradients and tones. Color patterns such as color blends and color transitions are herein referred to as color gradients which obtain their unique composition based on the sequential combination of color coatings utilized for such processes. Its design and blending capabilities provide for the creation of highly customizable color blends immediately prior to utilization.

A practical example of the uniqueness as provided by the invention resides in the user's ability to utilize a selected number of color coatings for creating a gradual color transition across selected areas of a designated surface. Such a transition realizes the gradient concept, as seen in various computer aided graphic design software. For example, the user may require a color blend from red to green along the length of a specified surface.

The information processed by a programmable computer is loaded as external selectable data, marked up data or in external selectable layer form. This information may exist in external proprietary format, and nevertheless be compatible with gradient specific digital processes and thus constitute color coatings gradient layer form.

Color coating gradients are obtained from images which may be surfaces, data or layer specific and selection is made from fractional image, complete image, multiple images or populations of images. These images may be in internal storage or loaded from external sources in static or dynamic form.

The blender apparatus attached to a coating applicator serves as a delivery device for color coatings gradients. Methods and processes interface the color coatings gradient with its data and surface layers, and vice versa.

A programmable computer can be used to determine the correct sequences which involve, amongst other functions, ejection of coatings from the blender, transit times of coatings through channels to a proximate applicator or to a remote device through a fluid line with or without line splitters.

The interchangeability, modularity and portability of the blender apparatus allows for multiple integrating combinations. As such, controlling the blender apparatus is harmonized with controlling the coating applicator and its mechanical means of motion, unless the coating applicator is removed from its assembly by an operator, when applicable. These control processes and methods are also linked to both external and internal parameter monitoring devices and appurtenances and communicate with automated control systems. These externally selectable monitoring devices and appurtenances, depending on their function may also send and receive signals in wireless mode. Sensors may also detect particular phenomenon by utilizing corresponding receptors. In addition, environmental monitoring equipment may include audio, video and motion or any other phenomenon as required for detecting specific conditions. Equipment such as a digitizer or a frame grabber can be utilized in conjunction with monitoring devices. These devices are also utilized for analog to digital conversion of color coatings physical gradients. It should be noted that some of these devices and data processing systems may be analog, and thus require analog to digital conversion. Further consolidation and collaboration is achieved through higher level digital processes which are interlinked with layer manipulation digital processes by sending, receiving and analyzing signals.

Blender attachments may be selected by an operator or with automated control systems such as programmable computers which optimize components and their arrangements. The blender apparatus is versatile and to make it operational it requires multiple components: inlet valves, bleeder valves, external and internal parameter monitoring devices, containers, tubes and piping, spindle drive mechanism, coatings applicators and related motion devices; together with coating technical aspect enhancing devices such as atomizer nozzles. When producing gradients through automated processes which may include multiple coating applicators and related motion devices, an applicator enclosure may be required to protect internally located components which could include x-y-z coordinate or global positioning systems.

The production of color coatings gradient layers can utilize spray coating applicators, print coating applicators and injector coating applicators. Gradient layer production can be entirely automated where control rests with a programmable computer, else an operator can exercise override, options to control gradient production processes. It should be noted that due to the complexity and the number of components to be controlled, especially when gradients are produced with a combination of coating applicators, higher level digital processes have a important gradient critical function. Optimization of blender components and operator driven sequences are meant to enhance variable color blending. The automated integration of blender, coating applicator and motion device permits operator overrides to a limited extent, the reason being, various components are required to produce a color coatings physical gradient. While an operator has options to override any and all digital processes, this may not be easily facilitated because of the complexity of the integration sequences. The higher level of integration is digital process driven even when an operator initiates partial functional override. Control of overrides rests with a master operator who predetermines decision nodes available to lower echelon operators.

Other coating applicators which work in conjunction with spray coating applicators, may be utilized with methods described to produce color coatings physical gradients. However the precision and control of coating compositions are such that the gradients produced may not accurately reflect the desired digital gradient unless the said coating applicators are calibrated and integrated with higher level digital processes.

When attached to a spray coating applicator, the blender apparatus serves as a delivery device for color coatings gradients. User actions and programable computer digital process sequences are used to manipulate the color coating gradient parameters thereby integrating their mark-up characteristics and allowing for further analysis of color coatings gradient layer dynamics.

Color coatings gradient layers are versatile visual value added vehicles where colors are comprised of marked-up elements and elements comprised of marked-up colors.

Information which is inputted from outside local security parameters is compared against virus definition files and security layer standards. Information may be encrypted, in which case, the security check involves removing encryption from the information loaded.

Information loaded exists in various forms and file types and as such, multiple computer software information specific external selectable editors are required. When working with data, the lack of graphic visualization limits the number and types of available editors to be used. When working with custom information, specific editors may be required.

Editing custom elements, is facilitated by the fact that external selectable layers can exist as systems and applications independent units. As such, layers can be manipulated with commercially available software such as Photoshop, MapleSoft, Mathematica, SAP, Access, Cognos and any of their components, which for the purpose of gradient processing become external editors, and the products of said editors are integrated for use as externally processed gradient layers. This editor versatility also means that the editors may operate entirely as digital processes which can be overridden and run by an operator when blender apparatus specific and coating applicator specific processes are selectively chosen. Color coatings gradient digital processes operating at a higher level integrate all hardware and software.

The process of manipulating information is to be done with commercially available input applications and devices where signals received by a programmable computer from the said input devices determine information manipulations. An operator may, at any time select a digital process available with an internal editor, either through GUI or command prompt. As such, the process of information manipulation is entirely automated. However, an operator can, at any time, override or selectively choose editor relevant digital processes.

Starting with information manipulation using digital processes, the color coatings gradient methods are unique since they enable for the creation of visually integrated surfaces. Layers may present information in columns, rows or in any x-y-z orientation. They may also contain information in their fractal state allowing an operator to reduce or enlarge any chosen information field.

Color coatings gradients may exist simply as visual products, where color coatings surface gradients are placed on surfaces or color coatings digital gradients are visually projected onto surfaces. As such, color coatings gradients exist on a “visual value added” level exclusively to those ritualized in the specific gradient elements, selected color space ranges and relevant color markup definitions as contained in the gradient syntax map.

Color coatings gradient rituals are an extension of the postmodernistic approach of cold symbolism which decontextualizes symbolic form from its inherent framework, this is where the incorporation of visual value added creates the aesthetics of gradientism. This approach further enriches our visual environment, allowing organizations to adopt gradientosophie (gradientosophy) in order to focus on their organizational dynamics.

Color coatings gradients will provide more dynamic approaches to valuations. By embedding values in colors as alphanumeric elements, organizational concepts and communications, especially numerical valuations, will be visualized. Production functions and valuations on a digital layer can be manipulated through user action and programmable computer digital process sequence and readily compared against each other on multi-dimensional levels.

Digital layers are extremely versatile and their interactivity and functionality is limited only by operator selected editor means and related digital processes. Dynamic layers and information are captured as static images and only when displayed in sequence, they gain an apparent dynamic form. As such layers and related data may be: linked; integrated; acting in unison in simulation; utilized for economic modelling and optimization; part of other digital structures; utilized to represent complex relationships and linkages; responsive to changes in other structures; and, representative of change and form an integral part of multi-level frameworks. Layers, based on their complexity, may be saved as one or more file types which may be in either specific proprietary software or open source format, as decided by the operator or required by information complexity.

Figure 6:
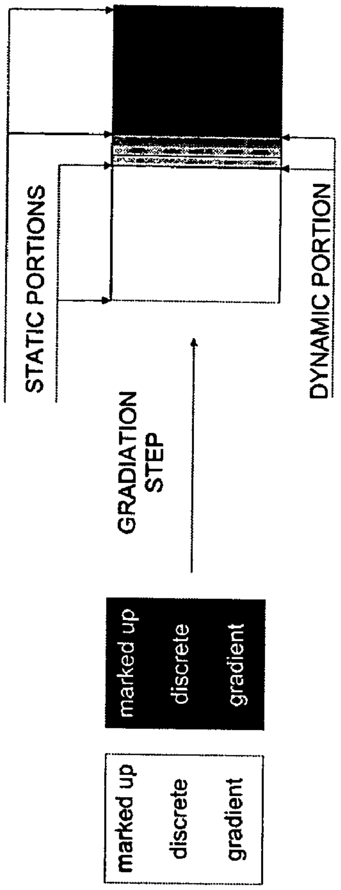
FIG. 6 Is a graphical representation of certain terms used in this submission and is meant to assist with an understanding of the gradient structure. As can be seen, the 'dynamic' portion is made up of discrete segments and is bounded by 'static' portions. This arrangement can repeat itself in cases of expansion and contraction.
Figure 7:
FIG. 7 Is a graphical representation of the use of a syntax map. The example uses the four letters of the word "WORD" as color tags to manipulate the alphanumeric data contained in the alphanumeric string "NUMBER."
Figure 8:
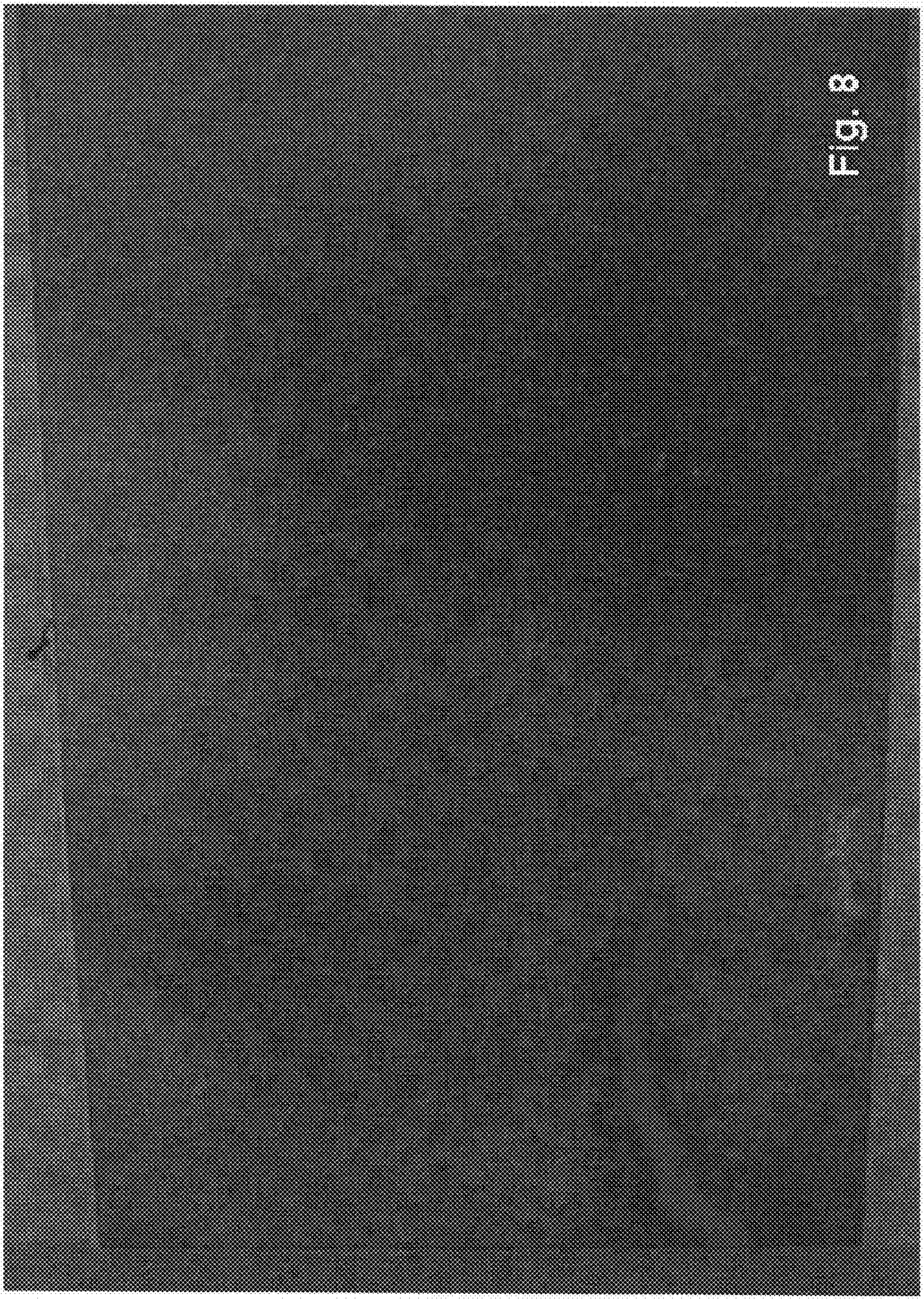
FIG. 8 Is an illustration of the need for configuring the spray coating applicator to avert failure when utilizing heavier coatings (in this case blue and yellow).
Figure 9:
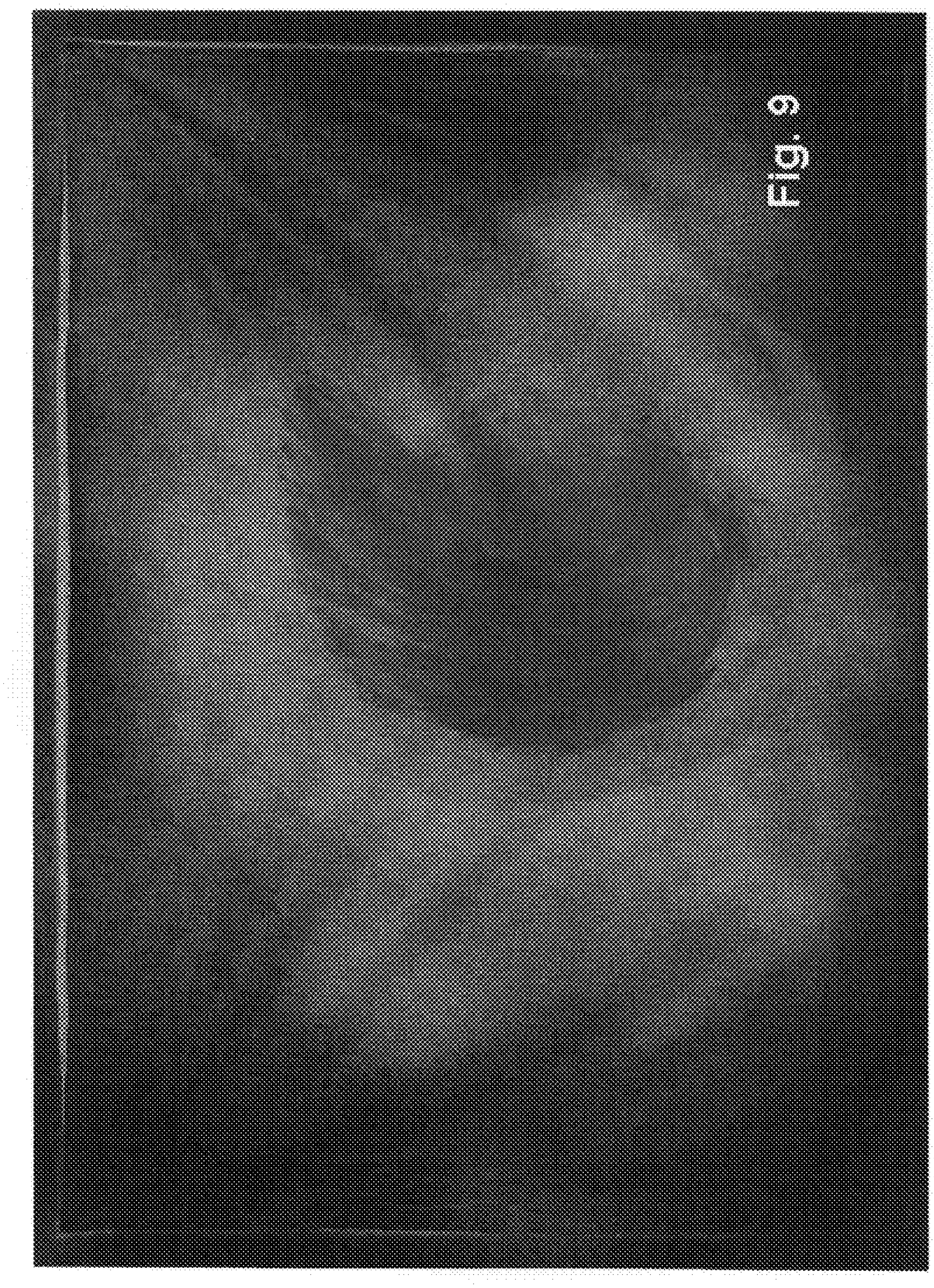
FIG. 9 Is an illustration of the effect of gravity and coating density during the process of creating surface gradients. In this case the first color blend (red) was covered with a second color blend (yellow and green). When the centre of the canvas was overlaid with the second color blend, a brush had to be used to overcome the effect of gravity on the excessive amount of coating, and this exposed the first color blend.
Figure 10:
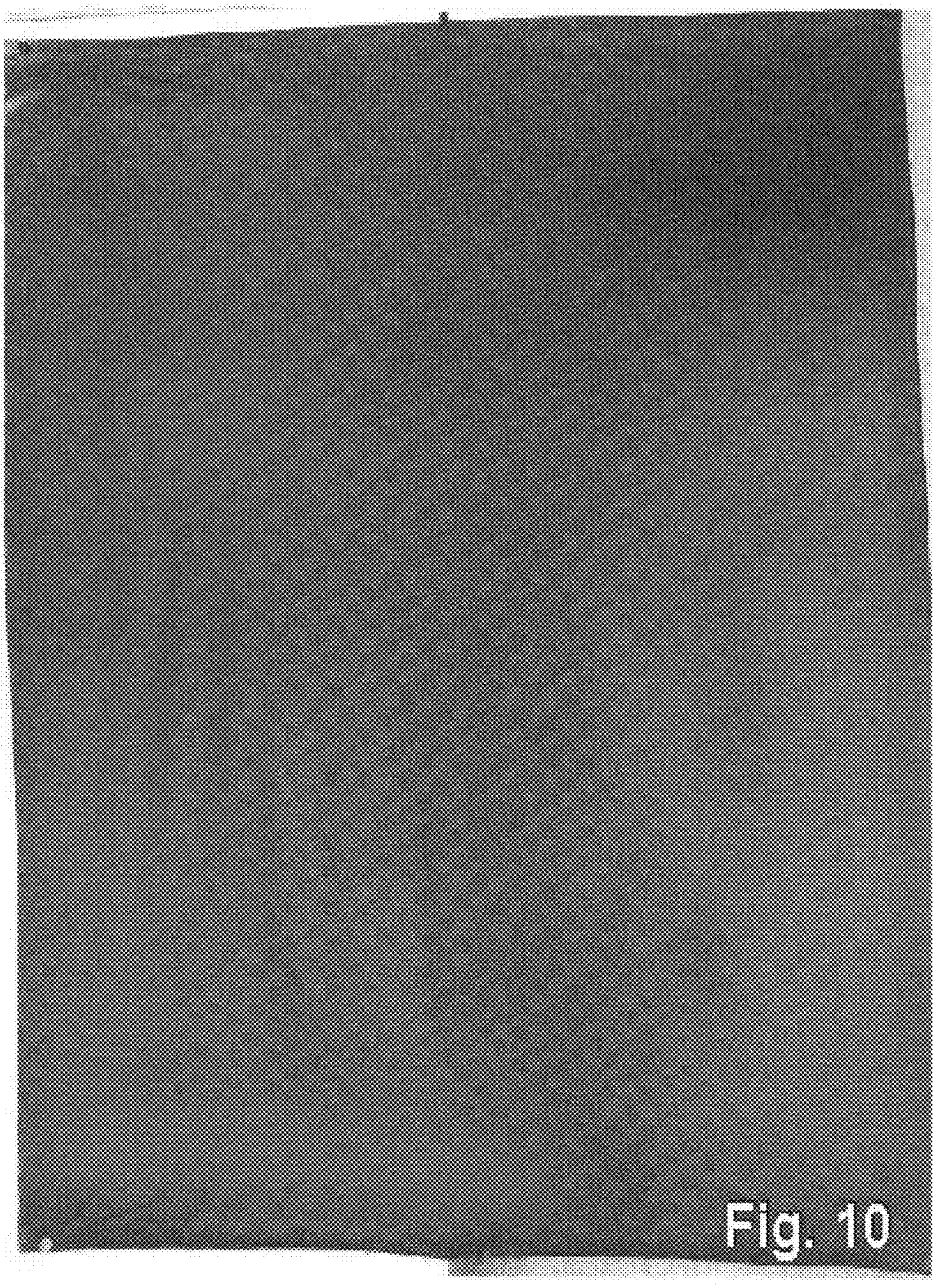
FIGS. 10 and 11 Are illustrations of the importance of the need for properly preparing the surface to be coated by stretching fabric to avoid sagging (FIG. 10) and for applying a protective finish to avoid fading with time (FIG. 11).
Figure 11:
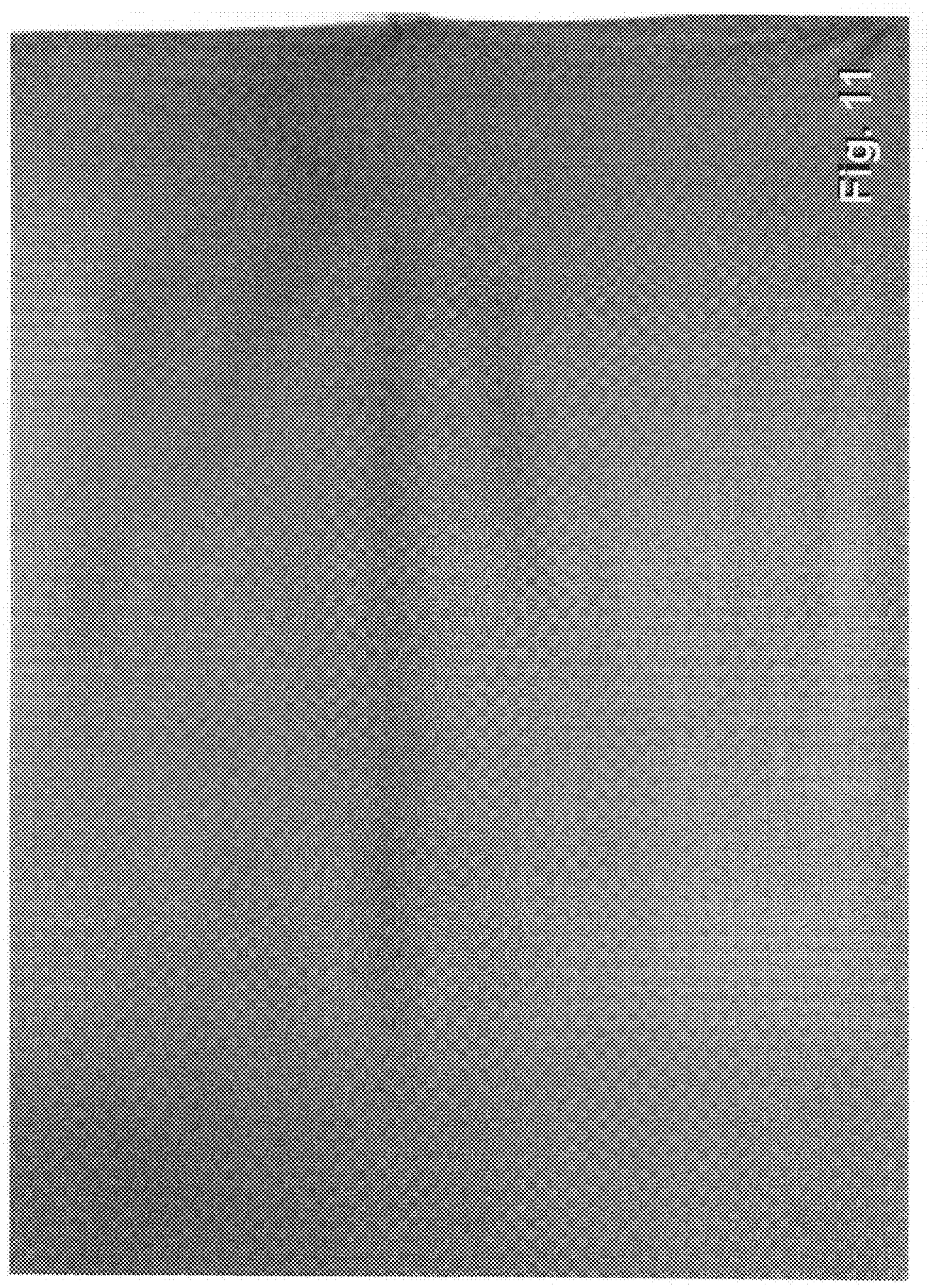
Figure 12:
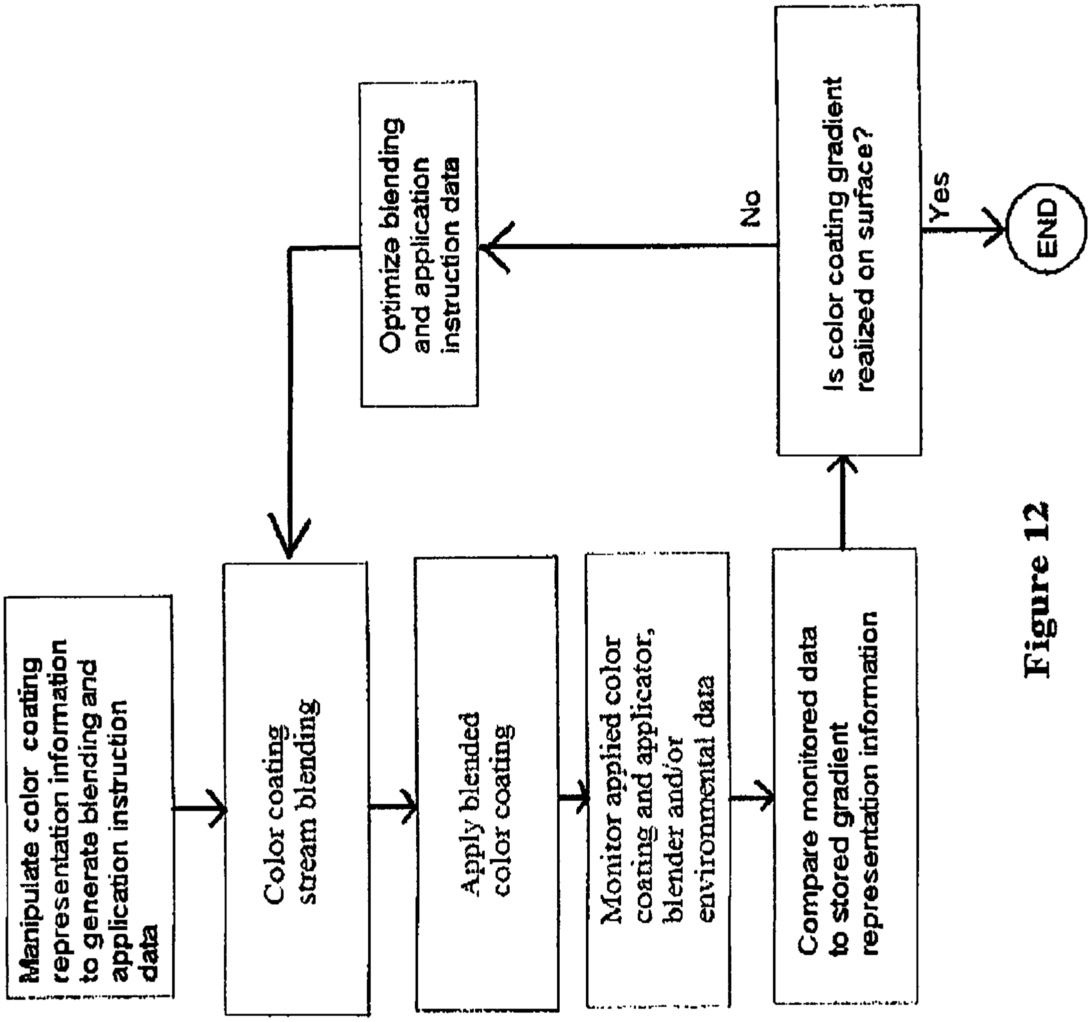
FIG. 12 Is a flow diagram illustrating the steps describing the method for processing color coated gradient related data for purposes of realizing color gradients on surfaces.
Figure 13:
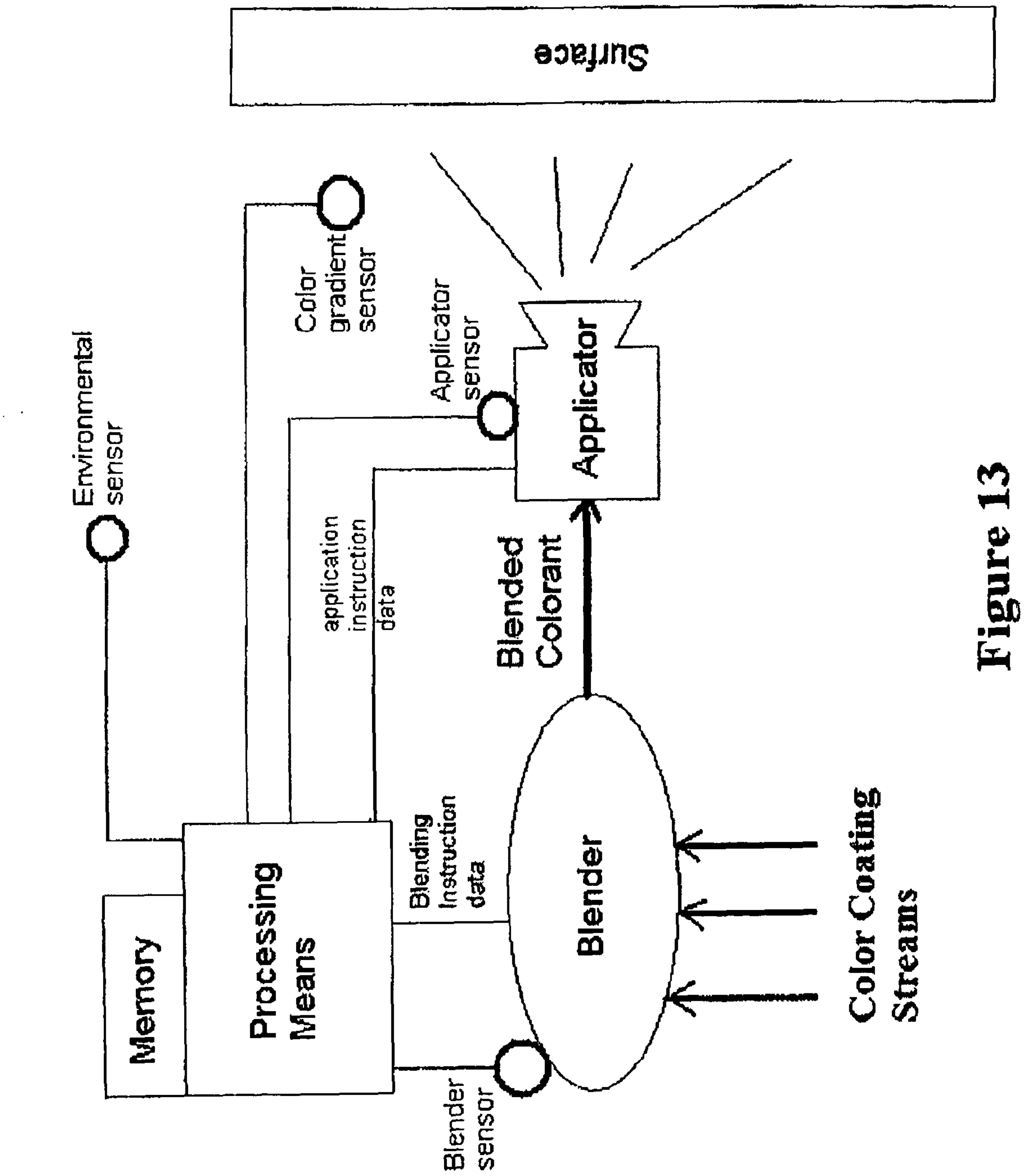
FIG. 13 Is a diagram illustrating the components involved and related data capture points and sensors for realizing color gradients.

In certain mathematical operations and for the purpose of layer digitization, the classification of color coatings gradient layer characteristics and types is necessary. As such, gradient characteristics can be defined as static or dynamic portions based on their duration or frequency, as illustrated in FIG. 6.

The invention of the blender apparatus provides distinct methods which facilitate the design and creation of color coating gradients, thus realizing products which have multiple novel visual value added uses.

In order to perform analysis as part of the gradient layer production process, a monitoring layer is derived from the environment and digitized. In physical environments, this “slice of reality” digitized layer is a layer where changes and interactions detected by digitization means can themselves form a new digital layer. Such a digitized monitoring layer and any additional layer become products monitoring environmental conditions. When a color coatings gradient is being integrated with any external layer, the results and the immediate environment can be monitored as delta layer(s) and stored as an expanded color coatings gradient(s). In such a case an approach to a layer is, in itself, a delta layer.

A delta layer is mapped as a digital layer and reproduced as a surface layer. A disturbing force having mass and in close proximity to a coating apparatus, notwithstanding "real life" layer dynamics, position of digitizing equipment and the environmental conditions in which the monitoring and delta layers are positioned, causing the interaction and thereby creating a new delta layer, can itself be coated. A disturbing force lacking mass but nevertheless causing the interaction and thereby creating a new delta layer, is digitized.

When the monitoring layer is processing entirely digital environments, any layer interaction with the said monitoring layer can be recorded as another digital layer. The finished product is a color coatings data gradient layer.

An integrated step in the blender digital process communicates to the blender apparatus through a digital signal initiating color coatings gradient step sequence. When data or a layer are loaded into a programmable computer, it may be loaded as a real time layer or as real time data. The gradient process may utilize and manipulate: just data; data into layer; just layer or a combination of layer data manipulations.

Digital layers may be analysed while in linear, non-linear or chaotic state with the dynamics of such systems parsed with specific editors. Artificial Intelligence (AI) specific editors may utilize neural networks to suggest or implement alternative layer sequences such as next, derivative, complement, contrast or any other mathematical operation specific layer, in any state. When utilizing advanced editors incorporating AI, layers may self integrate with other designated marked-up layers while processing a sequence, introduce alternative layer sequences and map the sequences as an information spider layer. As such the map layer in digital form may operate as a combination of other dynamic layers. Editors may also order specific gradients into sets gradient, sets gradient into groups gradient, groups gradient into plurality groups and plurality groups into gradient universe.

Following the process of information manipulation, the information has to verified, so that it is in proper relevant format for additional stages. Information verification is performed to verify and validate numerical, markup or alphanumeric components.

A color coatings gradient layer in digital mode can exist as a systems software or an application software independent layer. Customization, manipulation and analysis of such a layer is always performed on a programmable computer which operates a specific platform software utilizing operator selected application software which for the purpose of color coatings gradient digital processes are utilized as external editors. The operator can also select user-written software tailored to specific systems software or applications software such as, scripts, filters, applets and objects. The verification process which follows loading of gradient information can also convert or translate gradients, while simultaneously ensuring their data and layer validity. Following additional processing, the integrity of the sequences, patterns and spatial features of layers can be verified. As such, language or programme specific instructions from one platform are unlike those of another platform or application; a fact which greatly increases the diversity of information manipulation and visualization options available to the operator.

External data may at times be required by organizations in order to create color coatings gradients. This data can be obtained from numerous external information sources which may pertain to economy specific micro or macro factors, or be related to an organization's operations related information as required for comparison purposes.

The color coatings gradient layer method introduced with this invention utilizes the SGML standard of structural and presentational markup codes also known as tags, which is a widely accepted format for marking up data, for providing enriched ways of comparing and presenting information embedded in the color coatings gradient layer.

A syntax map defines the duration and frequency, of the static and dynamic discrete gradients. The map also defines structural and presentational markup instructions and elemental markup properties. The choice or selection from the virtually infinite range of color space values which can be assigned to instructions or elements, ensures that the information displayed is totally secure in that only those persons with access to the syntax map can decipher and interpret its meaning. An organization may also utilize its color coatings gradient layer which incorporates its unique syntax map, which could be sequentially or randomly, or an arbitrary combination thereof, derived, as a corporate data archive and store specific information in digital form as a digital gradient layer. A syntax map for a primary gradient layer can be embedded on a secondary layer using a different syntax map, and so on, and so on. A further level of security can take the form of a decomposing information layer which is used for "shredding" and distorting information. The gradient manipulation/production process can also be performed on a stand-alone programmable computer which has sufficient RAM memory to carry out these processes, thus guaranteeing total security of the information which is lost when the computer is turned off unless it is stored on a removable disc for use elsewhere. When an extra level of security is required, processes involved in handling organizational information can be audited. If security is not an issue, a generally available syntax map may be utilized by an organization. Numerical analysis software currently available in the marketplace assigns positions to data points and represents them in color, which by themselves constitute markups. In digital form, such markup instructions are available where pixel position and color convey meaning. A syntax map available with color coated gradient layers constitutes the conjunctions between a digital and a physical gradient, thereby creating gradient layer homogeneity and uniqueness.

Gradient delta layers may be recorded and utilized in designing optimized component assembly sequences. This would involve determining the position of, and setting up equipment for, monitoring assembly and attachment sequences, passing received signals to a programmable computer and then utilizing the data received to optimize processes being monitored. The same delta monitoring used to optimize related sequences can be also utilized to produce color coatings gradient layers. Additional delta layers and related gradient layers can be assembled by monitoring coating applicator configurations, blender apparatus positions, operator and coating applicator independent or joint movements, environment specific parameters, adjustments required to calibrate coating applicators as well as project specific interactions.

Conventional input devices such as keyboard, mouse or joystick may be utilized. However any interactive interactions may utilize intelligent devices detecting physical responses such as a body suit or an iris response system. This level of interactivity implies that an operator can be involved in a color coatings gradient layer process locally or remotely. The higher level digital processes are designed with signal tags so that they may receive signals from, and integrate, additional external peripheral devices. Inter connectivity between layers through hyperactivity can be facilitated through GUI and user selected input devices creating alternative levels of interactivity. A layer can be inputted by an external layer processor utilized for fun such as a video game further increasing operator interactivity. Because colors have different appearances under differing lighting conditions and computer hardware and software characteristics, a procedure for color calibration across all internal and external components involved in the gradient layering process should be followed. Depending on operator ability to utilize the chosen input device and the environment in which the device is being utilized, higher levels of interactivity can be achieved.

Color coatings gradient layers are novel and unique products of this invention, since they exist in three distinct yet interlinked forms. A color coatings gradient layer is a combination of color coatings digital gradients and color coatings physical gradients. As a color coatings gradient layer, the product is an integrated marked-up gradient where the integration exists between the physical and the digital layers. A color coatings data gradient is a digital layer. A color coatings surface gradient is a physical layer. Color coatings gradient layers may cross or be a combination of other layers in any direction or data relation.

A color coatings physical layer can be transferred on to a non-stick surface such that its inverse is to be imprinted upon another surface or rolled as a film. Caution should be exercised by an operator when depositing coatings manually on surfaces because excessive amounts deposited in any one location will be subjected to the law of gravity and flow, which would result in distortion of the gradient. When the process is totally automated, this is avoided by optimization. However, some operators may choose to utilize the digital gradient design process followed by free-style artistic expression to create a color coatings gradient.

The invention pertains to the field which encompasses the application of coatings having virtually instantaneously selectable color gradient compositions onto designated textured or smooth surfaces which are flat, curved, undulating or the interiors or exteriors of 3-D objects and spaces. The coating project may require the application of coatings on to already existing fixed or mobile surfaces in which case surface preparation prior to coating application is of paramount importance. Other projects could include the coating of a variety of fabrics and canvases with differing properties such as thread counts, conductivity, reflectivity and porosity; and fabrics and canvases containing digital threads. Incorporating digital threads into a color coatings gradient layer is done by integrating the thread information parameters as a layer. Additional synthetic materials which absorb coatings may also be utilized, else synthetic materials can be primed and prepared to absorb coatings where their final state can in themselves become digital layers. To ensure durability, color coatings physical layers should be clear-coated with a protective coating layer. A previously permanent (clear coated) gradient layer, which, due to organizational change, passage of time or owner intent has become irrelevant, may given the right coatings, be re-coated using either blender apparatus related or operator chosen techniques. When coating services are related to specific industries, those surfaces may actually be durable or non-durable products, objects or life forms.

This invention introduces a unique approach for presentation of alphanumeric data which has been captured, stored and processed in a programmable computer to be viewed in a visually aesthetic and readily understandable manner.

The delta layer recording of an operator preforming a color coatings gradient sequence can be utilized as an image, static or dynamic, for blender apparatus and related processes marketing purposes.

This invention and its related digital processes are designed to achieve precision (in terms of results) when combining two or more coating materials in viscous forms. Additives which change the chemical properties of coatings such as retarders, flow enhancers or thickeners can be added as a part of the blending process to change coating properties. Mediums which change the working characteristics and properties of coatings can be blended or placed onto physical surfaces as required by an operator. Protective coatings such as varnishes or preservatives, can be utilized to ensure permanency, since some coatings fade if not protected.

The components and related methods may be used for the applications in artistic, culinary, architectural, interior design, industrial design, body care, fashion and information processing. The components and related methods can be utilized for providing "visual value added" services, goods manufacturing, fabricating and fine finishing.

Personal artistic expression depends greatly on manner of fulfilment. When operating in overlay (free-style) mode the artist operator decides on color coatings physical gradient completion. In such a case the artist has the option of placing a gradient overlay, or an overlay style selected from relevant image(s).

Color coatings gradients have real world applications by enabling individuals and organizations to expand upon the process of communication. The enriched means of communicating which incorporates alphanumeric elements in general and numbers in particular, allows for the analysis and presentation of the subject matter in a visually coherent manner. This aesthetically structured alphanumeric presentation layer enables an operator to incorporate meaning within the colors contained in communications materials and publications.

Integrative abilities of visual color communication methods, which may involve the use of an organization specific production function, may also allow organizations to discover critical links and synergies which locates the organization within the overall economy or its natural environment.

Visualization is an important feature of human-environment interactions as stated in the adage "you have to see it to believe it." Furthermore, visualization of alphanumeric elements which are organizational objectives, results, symbols or any other organizational content utilized in the communication process, will further engage members of organizations in discovering and creating new, and re-stating and re-affirming existing shared principles, thereby giving credence to the adage "learn by doing."

Where results are incorporated as colors into organizational symbols, the aesthetic effects of the embedded results have specific meaning only to those who have participated in the color coatings gradient ritual or those who are privileged to have access to the color coatings gradient syntax map. Organizational rituals involve the production of custom color coatings gradients the meanings of which are proprietary and can only be accessed with the use of a syntax map containing the definitions of standard and custom markup tags as well as the definitions of standard and custom color spaces. The extensibility of a defined markup framework provides an organization with the means for ensuring its specific recordable information is secure and safe from third party espionage. Thus, those who participate in the color coatings gradient ritual will experience an interactive form of infotainment, and by learning, edutainment. The color coatings gradient rituals inform and educate participants and the rituals evolve into team building activities.

In cases where products are delivered either as infotainment, viz., informing operators, edutainment, viz., educating operators, who are also participants; or team building where participants are operators, creating color coatings gradients with teamwork; specific operator interface may allow for digital process override as set by the master operator, and defined in the operating procedures.

An organization sending layer related data over networks may do so from static data sources, where such data is predefined and is organization or economy specific. Layer related data which is dynamic as derived from environmental monitors, sensors or process documenters, may also be sent over networks and integrated within the layer framework. Both static and dynamic data can be multiplexed or exist as discrete data streams. Such data may be encrypted and come from multiple sources in order to be combined and integrated into the layer framework.

The novelty and uniqueness of this invention are further highlighted by the current limitations placed upon the field of this invention by existing dictionary definitions of a gradient. Current definitions are segmented and not fully integrated as intended in the context of this invention. The first segment for example is in the field of mathematics where a gradient is defined in dictionaries as a range of gradual numerical change, and another definition as the rate of sloping ascent or descent, where the latter is the predominant definition.

The second segment is in the field of computer graphic design, and does not yet appear in mainstream dictionaries. In graphic design lingo and especially in graphic design user guides, gradation is defined as color range. Conventional graphic design programs such as the commercially available Photoshop and the GNU Gimp all utilize gradients. Graphic designers incorporate existing gradients by integrating them into fills, layers, masks or filters and have the option in advanced mode to design their own custom graphic gradients. However, these are a few of the commercially available computer software digital process whose designs are re-produced by using printers and therefore lack the dynamism of the color coatings gradient form, whereas this invention introduces dynamism which creates visual value added.

The above segments do have an implied common theme in that a gradient is a mathematical range and in that colors are numbers forming gradients from a predefined color space, such as the one created by the International Commission on Illumination. This invention will harmonize data and surface layers in integrated marked-up alphanumeric communications and allow marked-up color coatings to be applied to 3D surfaces. Since this invention is novel and unique, not only does it introduce a new apparatus, product, use of product and related processes, it achieves an explicit common theme between the two separated segments of the lexicon.

The processes and methods involved in mixing various selectable components are different from those related to blending. Dictionaries define blend and mix as being synonymous, however when one looks deeper into the definition of the two words we can see that blending incorporates different tints and small or imperceptible gradations as in shading; and mixing relates to combining components in a general manner.

Exemplary Mode of Use

For example, configuring the apparatus for a specific end product and the method used to achieve the required result is as follows.

An mathematician/business analyst/artist wanting to experiment with a new art production technique. At the blender's establishment, he enters a ventilated coating room and sees a graphical interface screen and multiple coaters mounted on to what appears to be an automated frameworks facing a stretched canvas surfaces. A sign on the wall makes him aware that he can detach a spray coatings applicator and select the option contained within the graphical interface to operate the applicator in free style mode. As an inquisitive person he wonders as to the complexity and inter workings of this machine. He decides that he wants to coat a 60 cm×100 cm canvas with acrylic paint. He then selects the CMYK base color compositions to create multi-color gradients in an attempt to harmonize with the interior colors from his living room. The experiment commences. When satisfied with his creation, he leaves the canvas to dry before applying a clear protective coat.

He spends several days evaluating his canvas and appraising its aesthetic value. He finally reached a decision to embrace the color coatings gradient layer technology to its fullest extent and pondered over the methods he would use. Being somewhat familiar with computers, he decides to experiment further by manipulating layers with editors which are computer software digital processes.

Since the mathematician does not want to loose his initial canvas, he photographs it using a digital camera and downloads the image into a computer. The mathematician had previously obtained training on mathematical software MapleSoft and Mathematica, business intelligence software Cognos, enterprise management software SAP and database software Oracle. The mathematician is aware that he can utilize these softwares as external editors to manipulate data/information for layering in order to utilize them with color coatings gradient processes. He however chooses to separate his work and personal life and decides to utilize his favorite graphic authoring software Flash, and video game Sony PlayStation Final Fantasy to create layers and incorporate them into his gradient layer. He brings in his favorite Flash cartoon, stills taken of his top score in Final Fantasy as well as his childhood photos of himself playing a flute, all to be digitized and inputted as layers.

Upon arrival at the blender's establishment, he discovers that the color coatings blender is being utilized by another person so he decides to occupy his time playing Final Fantasy. Not having his memory card with him, he starts from scratch and records his actions while playing the game with the intention of utilizing the game actions as sequences to be edited.

The mathematician flattens his dynamic layers based on color and structural characteristics as chosen through color coatings blender computer software processes GUI, and then links the cartoon, the video game and the picture layers by color depth characteristics in order to create an integrated color coatings gradient in horizontal quarter sections for each of the gradient layers.

The following week, the mathematician has a party to celebrate the coincidental occurrence of the Harvest Moon rising on the eve of the Autumnal Equinox. At the party, his friends see the canvas produced and enquire as to its meaning. Upon receiving an explanation of the processes involved a few of them leave the party, go to an adjoining room and, using their host's computer, visit the blender's website.

It so happens that one of the mathematician's friends is a writer who always carries his book with him on a CD. He uploads its contents to the blender's server and remotely transfers his book into a digital gradient layer by using a standard syntax map. While the book is uploading the mathematician decides to create a special gradient celebrating "the Equinox party." He simultaneously uploads additional data from his web cam and his interactive living environment system into the blender's servers. The mathematician chooses to set gradient layers for each of his guests, and base them on the amount of drinks each of them has consumed. Since the mathematician is aware of privacy information policies, he decides to de-personalize the gradient layers by transmitting them without pictures and names, rather by colors of the individual party goers' clothes. After seeing a sample of the unified gradient form of his "party gradient," the mathematician decides that the gradient should be saved on the blender's equipment and that he should oversee its production at a later date.

Another one of mathematician's friends, an earth scientist, decides to "dial into" his environmental monitoring lab to transfer his data as ratios, and readings from his monitoring equipment. Due to the size of the data streams, the scientist is unable to do this and he receives messages advising him against using a third party terminal to send data to the blender's server. The scientist is also advised that due to the structure of the data from his monitoring equipment he may have to filter it through computer software digital processes at his location, where the said computer software editor is able to convert his data into layer form data. The scientist decides to abandon the process and returns to the party.

The mathematician also goes back to entertaining his guests and that gives an opportunity to another one of his friends, a CEO of a diversified astronomic and astrologic information corporation, to finally sit down in front of the computer and write down the address of the blender's website. Upon doing this he goes back to the party.

The next day the CEO, revisits the website and reads about all the necessary data requirements to create integrated gradients. He decides to call up his mathematician friend and arranges to meet him at the blender's establishment.

On the day of the meeting, the CEO receives a message that the mathematician will be late, and thus he has time to begin forming and manipulating his own gradient layers. He decides to integrate his organization's astronomic and astrologic data with his company's symbols. These symbols are the company's logo and a statue of the Caduceus which adorns the lobby of his office building. He then chooses the star Spica and its celestial position in the heavens as his reference point for the beginning of the gradient syntax map color space values definition. Knowing that by using color coating gradient processes the coatings can be applied to 2D and 3D surfaces, he considers the idea of manipulating the organization's symbols and wonders whether he can output the gradient to coat the Caduceus statue. Aware that the statue with its base could not be readily transported to the blender's establishment, he enquires whether the blender apparatus could be taken to his company's offices and thus enable him to coat the statue. He is assured that the apparatus can indeed be used at his offices to coat the statue and any other movable or immovable object he wishes to.

Prior to manipulating his data, the CEO is distracted by the blender's marketing video which incorporated the visualization of the blending process in its logo. Seeing which, he realizes he can also utilize gradient layers to determine his organization's production function and thus allow him to see how his organization fits into its business and social communities and how it interacts with the natural environment. Being environmentally conscious, he is interested in visualizing his environmental and societal scorecards with the gradient approach. He also discovers that he can utilize the gradient layer concept and its interactivity to simulate his firms's position in the marketplace vis-a-vis other firms and perform this simulation to cover the next five years. He makes notes to himself to start compiling the necessary data and information for these gradient layers.

While the CEO watches the promotional video the mathematician arrives and not wanting to interrupt the CEO before the end of the video, he commences the evaluation of his "Equinox party gradient" prior to its fully automated production using multiple coating applicators.

The embodiment of the invention in which an exclusive property or privilege is claimed are defined as follows:

1. A method for producing a color coating gradient on a surface using a blender, an applicator, sensors and a computer memory containing stored color gradient representation information comprising the steps of manipulating said stored color gradient representation information to produce blending instruction data and application instruction data;

blending a plurality of streams of color coating in said blender wherein said blending is controlled by said blending instruction data;

applying said blended color coating to a surface utilizing the application instruction data and said applicator to form an applied color gradient on said surface;

generating monitored data as a function of applied color gradient on said surface and data related to said applicator said blender and the environment, utilizing said sensors;

comparing said monitored data to said stored color gradient representation information;

dynamically optimizing said blending instruction data and said application instruction data, based upon said comparing, while said blended color coating is being applied to said surface, wherein optimized blended color coating is re-applied to said surface when said comparing determines that the applied blended color coating does not match the stored color gradient representation information; and continually repeating the steps of blending, applying, monitoring, comparing and optimizing until the color coating gradient is realized on said surface.

2. A method according to claim 1, wherein said manipulating comprises using information loaded into a programmable computer from a selectable source for the purpose of manipulation by information specific selectable editors and further including the steps of;

security checking;

conversion of information and verification of information integrity;

comparison of information to selected layers of stored coatings information;

display of layer information;

manipulation of layer information; and verification of layer integrity.

3. A method according to claim 1, wherein said manipulating comprises using information loaded into a programmable computer from a selectable source for the purpose of manipulation by information specific selectable editors for conversion of information and verification of information integrity and comparison of information to selected layers of stored coatings information;

wherein said layer information includes physical layer characteristics which are displayed to a user;

and wherein said realized color coating gradient is identical to the displayed physical layer characteristics.

4. A method according to claim 1, wherein said color coating gradient representation information is comprised of colors having related color space values and markup instructions comprising alphanumeric expression content.

5. A method according to claim 1, further including the step of allowing an operator to interact with said blender, applicator and or computer through input means.

6. A method according to claim 1, wherein a signal is sent by said computer to a remote digital process.

7. A method according to claim 1, wherein a signal is sent to said blending apparatus.

8. A method according to claim 1, wherein a signal is sent to said applicator.

9. A method according to claim 1, wherein, in a manual mode, an operator may override the operations of the blender, applicator, sensors and or computer.

10. A method according to claim 1, wherein said step of applying includes:

controlling applicator movement;

and wherein said step of dynamically optimizing includes:

controlling internal monitoring parameters;

controlling external monitoring parameters;

controlling calibration; and controlling gradient information.

11. A method according to claim 1, wherein said steps of blending and applying include;

determining physical color component tool settings needed to produce a specific gradient;

determining calibration differences between physical color component tool settings.

12. A method according to claim 1, further including calibration as a digital process and wherein physical color component tools are integrated and recognized by the system with a plug-and-play method.

13. A method according to claim 1, wherein said step of manipulating further comprises sequentially comparing gradient characteristics by analyzing selected gradients with respect to gradient populations and their definitions.

14. A method according to claim 1, wherein said step of monitoring comprises;

monitoring changes in delta layers of said applied color coating;

determining the position of delta sequences in said applied color coating;

monitoring the position of said blender and or applicator equipment;

monitoring blender component assembly status;

monitoring blender apparatus and or applicator related signal sequences;

monitoring operator and coating applicator independent or joint movement;

monitoring immediate environment specific parameters;

monitoring signal sequences from external monitoring devices;

monitoring adjustments required to calibrate appurtenances;

monitoring project specific interactions.

15. A method according to claim 1, wherein said color coatings gradient is created during organized ritual events.

16. A system for producing a color coating gradient on a surface comprising:

computer memory storing color gradient representation information;

processing means configured to manipulate said color gradient representation information to produce blending instruction data and application instruction data;

a blender configured to blend a plurality of streams of color coating according to said blending instruction data;

an applicator configured to apply said blended color coating onto a surface according to said application instruction data;

sensors configured to monitor said applied color coating on said surface and data related to said applicator, said blender and the environment;

wherein said processing means is further configured to compare said monitored data to said stored color gradient representation information and to dynamically optimize said blending instruction data and said application instruction data based upon said comparing, while said blended color coating is being applied to said surface, wherein optimized blended color coating is re-applied to said surface when said comparing determines that the applied blended color coating does not match the stored color gradient representation information; and wherein said blending, applying, monitoring, comparing and optimizing are continually repeated until the color coating gradient is realized on said surface.

17. The system of claim 16, further comprising input means allowing an operator to interact with said blender, applicator and or computer.

18. The system of claim 16, wherein said blender, applicator and sensors are integrated and recognized by the system with a plug-and-play method.

19. The system of claim 16, wherein said manipulation comprises the steps of;

security checking;

conversion of information and verification of information integrity;

comparison of information to selected layers of stored coatings information;

display of layer information;

manipulation of layer information;

verification of layer integrity.

20. The system of claim 16, wherein said step of monitoring comprises;

monitoring changes in delta layers of said applied color coating;

determining the position of delta sequences in said applied color coating;

monitoring the position of said blender and or applicator equipment;

monitoring blender component assembly status;

monitoring blender apparatus and or applicator related signal sequences;

monitoring operator and coating applicator independent or joint movement;

monitoring immediate environment specific parameters;

monitoring signal sequences from external monitoring devices;

monitoring adjustments required to calibrate appurtenances;

monitoring project specific interactions.

* * * * *